United States Patent [19]
Schlatter et al.

[11] Patent Number: 5,384,004
[45] Date of Patent: Jan. 24, 1995

[54] APPARATUS FOR THE PRODUCTION OF A FLAME RESISTANT TO NONFLAMMABLE COMPOSITE PANEL

[75] Inventors: Reinhard Schlatter, Schaffhausen; Urs Gabi, Würenlos; Rainer Ehrat, Schaffhausen, all of Switzerland

[73] Assignee: Alusuisse-Lonza Services Ltd., Zurich, Switzerland

[21] Appl. No.: 240,311

[22] Filed: May 10, 1994

Related U.S. Application Data

[60] Continuation of Ser. No. 84,626, Jun. 30, 1993, abandoned, which is a division of Ser. No. 854,351, Mar. 19, 1992, Pat. No. 5,264,057.

[30] Foreign Application Priority Data

Apr. 10, 1991 [CH] Switzerland ............... 1060/91

[51] Int. Cl.⁶ .............................................. B32B 31/20
[52] U.S. Cl. .................................. 156/543; 156/62.2; 156/549; 156/555; 156/580; 156/583.5
[58] Field of Search .............. 156/622, 543, 549, 555, 156/580, 583.5

[56] References Cited

U.S. PATENT DOCUMENTS

| | | | |
|---|---|---|---|
| 3,109,763 | 11/1963 | Finger | 156/549 |
| 3,616,173 | 10/1971 | Green et al. | |
| 3,994,769 | 11/1976 | Gersbeck | 156/555 |
| 4,052,958 | 10/1977 | Delves | |
| 4,118,533 | 10/1978 | Hipchen et al. | 156/555 |
| 4,288,263 | 9/1981 | Delcoigne et al. | |
| 4,318,761 | 3/1982 | Dockray et al. | |
| 4,648,922 | 3/1987 | Marks et al. | |
| 4,810,445 | 3/1989 | Lamb et al. | 156/62.2 |
| 5,148,645 | 9/1992 | Lehnert et al. | |

FOREIGN PATENT DOCUMENTS

| | | |
|---|---|---|
| 0383251 | 8/1990 | European Pat. Off. |
| 0423074 | 4/1991 | European Pat. Off. |
| 1552561 | 1/1969 | France |
| 1582284 | 9/1969 | France |
| 2629117 | 9/1989 | France |
| 1136097 | 9/1962 | Germany |
| 2842858 | 3/1980 | Germany |

*Primary Examiner*—Caleb Weston
*Attorney, Agent, or Firm*—Bachman & LaPointe

[57] ABSTRACT

A flame resistant to nonflammable composite panel (86) is produced from a nonextrudable core mixture (24) with a pourable, nonflammable filling material and a binder, and on both sides cover strips flexibly bonded to the core. For a continuous production of the composite panel (86) in one operation, the core mixture (24) is poured onto an inrunning lower cover strip (48), in contact with a lower adhesive film (16) facing the core mixture (24), and a pile is formed there, extending over the entire width of the adhesive film, both [lacuna] continuously and uniformly drawn through a V gap (40) and compacted there for the first time and calibrated to thickness, an upper adhesive film (30), upwardly limiting the precompacted core mixture (24'), is fed in and brought into contact with a continuously fed cover strip (46) and the sandwich is pressed with further compaction, heated, cooled and cut to the final length of the composite panel (86). The apparatus for carrying out the process preferably comprises a double-belt press (43) for the concluding pressing and heating, for maintaining the temperature and for cooling.

13 Claims, 2 Drawing Sheets

APPARATUS FOR THE PRODUCTION OF A FLAME RESISTANT TO NONFLAMMABLE COMPOSITE PANEL

CROSS-REFERENCE TO RELATED APPLICATIONS

This application is a continuation of U.S. patent application Ser. No. 08/084,626, filed Jun. 30, 1993, abandoned, which is a divisional of U.S. patent application Ser. No. 07/854,351, filed Mar. 19, 1992, now U.S. Pat. No. 5,264,057.

BACKGROUND OF THE INVENTION

The invention relates to a process for the production of a flame resistant to nonflammable composite panel having a core, comprising a nonextrudable core mixture of a pourable, nonflammable filling material and a binder, and on both sides cover strips flexibly bonded to the core. The invention further relates to an apparatus for carrying out the process.

Composite panels are known in which metallic or nonmetallic cover strips are bonded to core layers, predominantly of inorganic nature, by bonding over the full surface with the aid of a binder. Although the core materials may be inorganic and nonflammable, owing to the lack of flexibility they are usually not capable of absorbing the deformations resulting from mechanical stresses or from thermal expansions of the cover layers. Such composite panels therefore suffer relatively often from a brittle fracture or a delamination. Furthermore, composite panels having a core layer of predominantly inorganic nature are usually moisture-sensitive or water-absorbent, as a result of which metallic cover layers may corrode, in particular if alkaline substances are used.

If inorganic core materials contain mineral constituents of great hardness or asbestos fibers, machining is only possible with special tools. Furthermore, machining is further hindered by the development of toxic dusts.

According to numerous national standards, materials having low proportions of organic substances, for example adhesive films, can be classified as nonflammable or at least flame resistant building materials or building elements.

On the other hand, core materials of purely organic or predominantly organic substances do not meet the requirement of flame resistance to nonflammability. If exposed to fire or other high temperatures, the decomposition of organic constituents causes large quantities of combustible gases to be set free.

It is known to reduce greatly the flammability of organic substances such as for example synthetic resins by the incorporation of largest possible quantities of, for example, aluminum trihydroxide. At elevated temperature, chemically bonded water becomes free and produces an effective extinguishing effect.

In DE-C3-2842858, a composite panel having two cover plates and a core of a mixture of a granular filling material and a conventional binder is described, which contains a high proportion of granular filler, in particular of aluminum trihydroxide, and a lower proportion of binder. The binder content decreases from the bounding surfaces of the cover plates to the center of the core, allowing a classification as nonflammable building elements in many countries.

A core mixture having a very high proportion of inorganic filler is not extrudable, which is why the production of corresponding composite panels is performed in cycles. First of all the lower cover layer, covered with an adhesive, is laid, then the core material is scattered on or otherwise applied. Finally, the upper cover layer, covered with an adhesive, is laid, and the composite panel is brought into the final form by heating, pressing and cooling.

Even with careful working, uniform, pore-free adhesive layers are not obtained, which reduces the corrosion protection. Furthermore, machine parts which serve for layer formation come into contact with adhering components, as a result of which the layer is irregularly formed.

Finally, adhesive layers of adequately high flexibility for the bonding of metallic cover layers to mineral-hard core layers cannot be applied.

The present invention is based on the object of providing a process and an apparatus for carrying out the process of the type discussed above which at least partly avoid the previously mentioned disadvantages and allow a substantially easier and more cost-effective production of flame resistant to nonflammable composite panels than the known processes, having improved properties with regard to the bond of the cover layers to hard core layers.

SUMMARY OF THE INVENTION

As far as the process is concerned, the object is achieved according to the invention.

The process of the present invention is a process for the production of a flame resistant to nonflammable composite panel having a core, comprising a nonextrudable core mixture of a pourable, nonflammable filling material and a binder, and on both sides cover strips flexibly bonded to the core, characterized in that, for a continuous production of the composite panel in one operation, the core mixture is poured onto an inrunning lower cover strip, in contact with a lower adhesive film facing the core mixture, and a pile is formed there, extending over the entire width of the adhesive film, both continuously and uniformly drawn through a V gap and, if appropriate, compacted there for the first time and subsequently calibrated to thickness, an upper adhesive film, upwardly limiting the precompacted core mixture, is fed in, the said film is brought into contact with a continuously fed cover strip and the sandwich is pressed with further compaction, heated, cooled and cut to the final length of the composite panel.

Advantageous further developments of the process according to the invention are discussed hereinbelow.

The process according to the invention allows a continuous production of composite panels having a non extrudable core mixture, which represents a great advancement in terms of productivity, but also in terms of quality. Thus, pourable to poor flowing, more or less tacky core mixtures of, for example, 60–95% by weight of inorganic fillers and 5–40% by weight of binder can be charged continuously onto a running surface formed by the lower adhesive film.

The tensioning control allows the generating of a constant tension of the films and/or strips, which is of major significance for a consistent composite panel quality.

The supply of the core mixture is preferably controlled in such a way that the consumed material is always replaced by new material, and the pile extending over the entire width remains constant.

Aluminum trihydroxide, magnesium hydroxide or magnesium hydrate carbonate, which on heating set free chemically bonded water and/or carbon dioxide, or, for plastics containing chlorine, antimony oxide, are particularly suitable as fire retardant, pourable filler of the core mixture, which preferably makes up 60–95% by weight.

Both thermosets and thermoplastics may be used as organic binder, the proportion of which in the core mixture is preferably 5–50% by weight. Phenol, polyurethane or polyisocyanurate resins, which have a low flammability and smoke development, are preferably employed as thermoset binders. If thermoplastic binders are employed, olefinic copolymers are preferred.

Cement milk, gypsum or water glass may be employed as inorganic binders. With an inorganic binder, the composite panels having metallic cover strips are virtually nonflammable in spite of the thermoplastic adhesive films.

Metals, in particular aluminum or an aluminum alloy, are primarily suitable as cover strips.

In the case of a particular way of carrying out the process according to the invention, the core mixture poured onto the lower adhesive film has a pouring angle which depends, inter alia, on the nature and size of the grains of the filling material and of the homogeneous mixed-in binder. In the case of a core mixture with smaller pouring angle or flowing pasty properties, a smaller first compaction, which takes place in the V gap, is used. In the case of a core mixture with greater pouring angle, a greater first compaction is also used. The smaller compaction is generated by a steeper running-in angle into the V gap and/or at least one small radius of its delimiting surface/s, the greater compaction by means of a flatter running-in angle into the V gap and/or at least one greater radius of its delimiting surface/s. In the case of a small running-in angle, the risk of jamming is greater, in particular in the case of viscous, tacky materials.

A rounding-off radius corresponding to the desired compaction of the core mixture can be set by pivoting the doctor knife bar or doctor knife blade and/or the running-in angle f can be set by means of the pitch of the corresponding longitudinal side. The doctor knife bar or the doctor knife blade and the doctor knife table can be fixed in every position of height and pivoting in such a way that the forces acting during feeding of the core mixture are unable to shift them.

In the case of the preferred embodiment of the apparatus, after leaving the feeding apparatus, the core mixture never comes into direct contact with a machine part. The sheet-form medium may, for example, be a film or a strip of plastic, rubber or paper, preferably in an endlessly guided way.

As far as the apparatus for carrying out the process is concerned, the object is achieved according to the invention. The apparatus of the present invention is characterized in that it comprises, in the running direction of the cover strips, at least reels with the lower and the upper adhesive film and with the lower and upper cover strips, one contacting roller pair each and deflection rollers for the cover strip in contact with the lower adhesive film and for upper cover strip in contact with the upper adhesive film, a device for the regular application of the core mixture to the lower adhesive film, first means for forming a settable running-in angle ($\beta$) and the adjustable V gap of the drawn-in core mixture, second means for supporting, at least in the region of the first means, the lower cover strip in contact with the adhesive film, and third means for the concluding pressing and heating, as well as a device for cutting to the final length of the composite panel. Advantageous further developments of the apparatus according to the invention will appear hereinbelow.

According to a preferred variant, the first means for setting the V gap are a pivotable, cross-sectionally round, oval or triangular to hexagonal doctor knife bar, in the case of angular cross-sections preferably with a different rounding-off radius at each corner, running in the longitudinal direction, or a pivotable doctor knife blade having at least one rounded-off, narrow longitudinal side.

With the process according to the invention and the apparatus for carrying out the process, continuously cured core layers with, in particular, metallic cover strips can be laminated into composite panels resistant to aging and weathering with a classification of nonflammable, virtually nonflammable or flame resistant.

Furthermore, the process and the apparatus allow the unusual simultaneous processing and bonding of thermoplastic and thermoset layers into laminated composites, the unusual layer formation with adequate constancy of thickness and density by strong compaction, also known as squeezing, of a nonplastic mass in a V gap defined by a running-in angle and at least one radius, the unusual weather-resistant bonding of hard inflexible core layers and relatively flexible metal layers with higher coefficients of linear expansion than the core layers, and the protection of metallic cover strips against corrosion due to any ingress of liquids from the sides by means of a pore-free layer formed by an adhesive film.

BRIEF DESCRIPTION OF THE DRAWINGS

The invention is explained in more detail with reference to the exemplary embodiments which are represented diagrammatically in the drawing and are also the subject of dependent patent claims. In the drawing:

DESCRIPTION OF THE PREFERRED EMBODIMENTS

Figure 1:
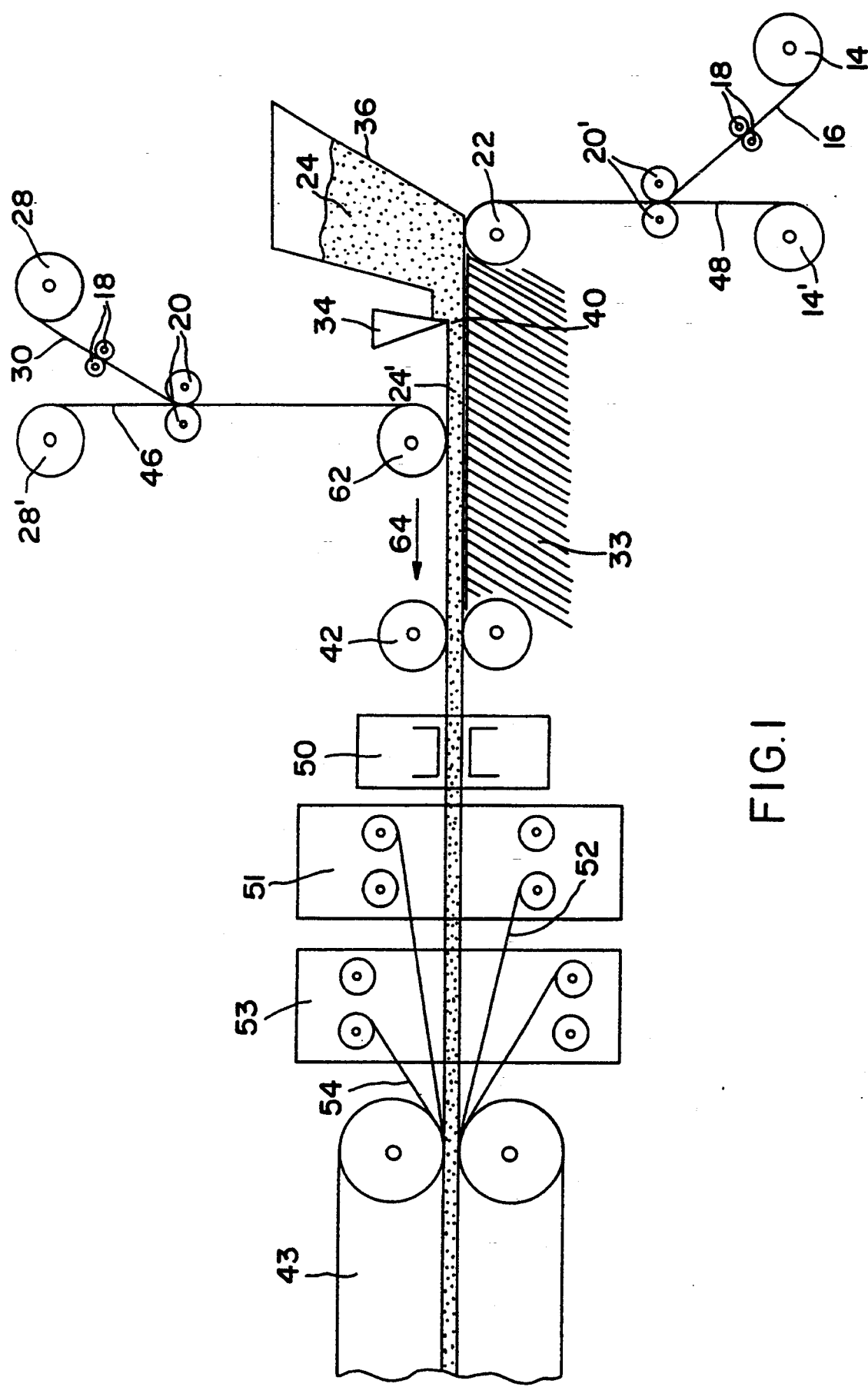
FIG. 1 shows a view of an apparatus for the continuous production of flame resistant to nonflammable composite panels.

According to a preferred way of carrying out the process according to the invention, based on the apparatus according to the invention in the embodiment according to FIG. 1, a lower adhesive film 16 is unwound from a lower reel 14 and led via a tensioning control 18, and a cover strip 48 from a lower reel 14' is led via a contacting roller pair 20' and a deflection roller 22, in approximately horizontal position into the region of the supply of the homogeneous core mixture 24. In this region, the lower cover strip 48 rests with the contacted lower adhesive film 16 on a sliding table as supporting second means 33.

A metering device 36 discharges core mixture 24 continuously or in small portions onto the lower adhesive film 16.

The sliding table and a doctor knife bar 34 or doctor knife blade 35 bound a V gap 40, which defines a calibrated feed for the core mixture 24. This is shown in detail in FIG. 2. The core mixture 24', drawn in and slightly precompacted by the calibration, is then covered by an upper cover strip 46, which on the side facing the core mixture 24' is in contact with an upper adhesive film 30, when it passes a deflection roller 62 and, if appropriate, is thereby also further compacted. This sandwich thereupon runs through, if appropriate with support from tensioning rollers 42, as shown in FIG. 1, preheating device 50 and a run-through press 73, which cause the composite panel 86 to be produced by further compaction of the sandwich to the desired final dimensions.

The bringing together of the upper cover sheet 46 with the upper adhesive film 30 takes place after the unwinding from the reels 28' and 28, respectively, and the running through of at least one tensioning control 18 with the aid of a contacting roller pair 20 in an analogous way to that of the lower cover sheet 48 and the lower adhesive film 16. A framework 51 with rolls of a protective film 52 and a framework 53 with rolls of a paper strip 54 may be arranged upstream of the run-through press 42, preferably designed as a double-belt press, for protection of the surface of the cover sheets 46, 48. Consequently, composite panels 86 of highest surface quality are achieved. In the run-through press 43 the sandwich of the precompacted core mixture 24', the adhesive films 16, 30, the cover strips 46, 48, the protective films 52 and the paper strips 54 is pressed, heated, kept at temperature and cooled, after which the composite panel 86 continuously leaving the run-through press 56 is cut to the final length, for example by corunning shears.

The core mixture 24' between the adhesive films 16, 30, which do not produce any adhesive effect in the pouring region of the core mixture 24, which mixture is drawn through the V gap 40 and, if appropriate, precompacted for the first time, can be compacted for the first time or once again between precompaction rollers (not shown), before or after it is covered by the upper cover sheet 46.

The sliding table, preferably adjustable pivotally and in height, as second means 33, is fitted by thrust and draw bolts arranged in the form of a grid on a carrier plate. With these means (likewise not shown), the preferably teflonized surface of the sliding table can be adjusted in relation to the dimensionally stable carrier plate. Consequently, unevenesses on the surface of the sliding table can be harmoniously compensated.

Figure 2:
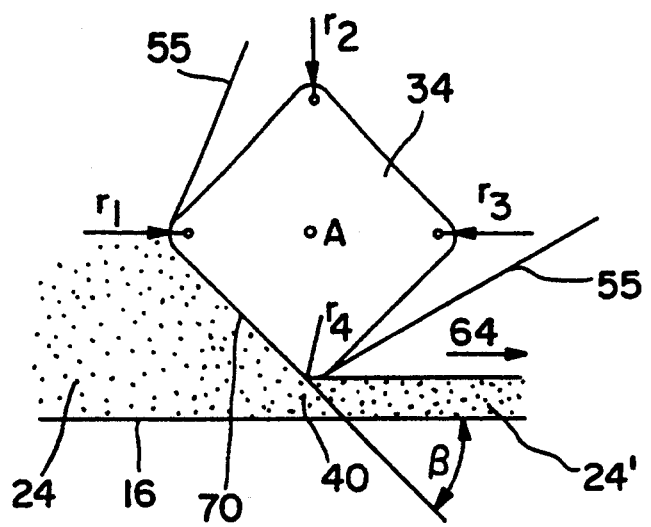
FIG. 2 shows a side view of a doctor knife bar.

A cross-sectionally square doctor knife bar 34, which can be pivoted about a longitudinal axis A and adjusted in height, is represented enlarged in FIG. 2. A plastic film, as sheet-form medium 55, passes around the doctor knife bar and slides along a teflonized side surface 70 of the doctor knife bar 34, forming the running-in angle $\beta$. The lower film 16, sliding on the sliding table, not shown in FIG. 2, runs horizontally.

Figure 3:
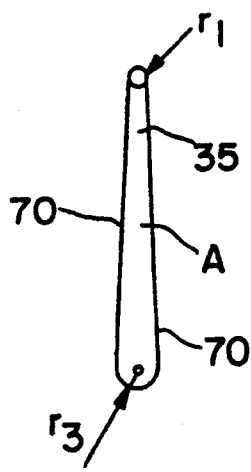
FIG. 3 shows a side view of a doctor knife blade.

A doctor knife blade 35, which likewise can be pivoted about a longitudinal axis A and adjusted in height, is represented in FIG. 3. With doctor knife blade 35 used in a way corresponding to FIG. 2, one of the nonparallel running side surfaces 70 forms the running-in angle $\beta$. Thanks to the nonparallel side surfaces 70, on the doctor knife blade 35 there are formed rounded-off portions with different radii $r_1$, $r_3$, which perform the same function as the rounded-off portions of a doctor knife bar.

It goes without saying that, in design variants of the doctor knife blade, the side surfaces 70 may also run parallel and/or only one rounded-off portion may be formed.

A preferred doctor knife bar 34 is of a sturdier design, for example in the form of a solid body or a thick-walled hollow profile, than a doctor knife blade 35 and can therefore remain freer from distortions when absorbing forces exerted on it.

It is evident from FIG. 2 that the core mixture 24' does not touch any fixtures of the machine. This contributes substantially to operational reliability and a simple maintenance of the apparatus, the tacky core mixture cannot accumulate on roller, roll or doctor knife surfaces.

Figure 4:
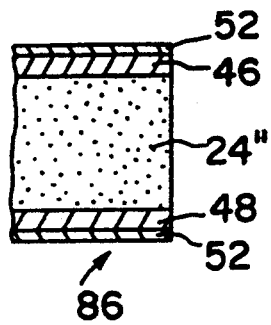
FIG. 4 shows a cross-section through a composite panel.

A composite panel 86, partially represented in FIG. 4, shows the core 24" of the compacted, cured original core mixture 24 bonded to two cover strips 46, 48. The cover strips 46, 48 are covered by protective films 52. The adhesive films as such are no longer visible.

We claim:

1. Apparatus for producing a flame resistant to nonflammable composite panel having a core comprising a nonextrudable core mixture of a pourable nonflammable filling material and a binder, and on both sides cover strips flexibly bonded to the core, which comprises:

means for supplying a metal lower cover strip and a lower adhesive film thereon;

roller means for the lower cover strip and lower adhesive film thereon;

means for applying a non-extrudable core mixture of a pourable nonflammable filling material and a binder to the lower adhesive film on the lower cover strip;

first means for forming a settable running-in angle ($\beta$) and an adjustable V gap downstream of the means for applying a core mixture, said first means defining a calibrated feed for the core mixture while precompacting the core mixture and obtaining the desired thickness thereof;

means for drawing the core mixture on the lower adhesive film through the V gap to form a laminate of a drawn core mixture-lower adhesive film-lower cover strip;

second means for supporting the lower cover strip in contact with the lower adhesive film at least in the region of the first means;

means for supplying a metal upper cover strip and an upper adhesive film to the laminate to form a composite panel of an upper cover strip—upper adhesive film—drawn core mixture—lower adhesive film—lower cover strip;

roller means for the upper cover strip and upper adhesive film downstream of the means for supplying an upper cover strip and upper adhesive film; and third means for pressing the composite panel.

2. Apparatus according to claim 1 including means for final heating of the composite panel and for cutting same to length.

3. Apparatus according to claim 1 including reels for the adhesive films and contacting roller pairs downstream thereof, wherein at least between the reels of the adhesive films and the contacting roller pairs there is arranged in each case a tensioning control.

4. Apparatus according to claim 1 wherein the first means for forming the V gap comprises one of a doctor knife bar and a doctor knife blade.

5. Apparatus according to claim 4 wherein there is a contact zone between the first means and core mixture, and on said first means there is at the contact zone with the core mixture a continuously moved sheet-form medium.

6. Apparatus according to claim 1 wherein the second means comprises at least one sliding table.

7. Apparatus according to claims 6 wherein said table is covered with polytetrafluoroethylene.

8. Apparatus according to claim 6 wherein the at least one sliding table is at least partially convexly designed transversely to the running direction.

9. Apparatus according to claim 1 including a deflection roller for the lower cover strip, wherein the deflection roller for the lower cover strip at the same time represents the second means.

10. Apparatus according to claim 1 wherein the third means is for the concluding pressing and heating, and is designed as a continuous press.

11. Apparatus according to claim 10 wherein said third means also maintains temperature and cooling.

12. Apparatus according to claim 10 wherein said third means is a double belt press.

13. Apparatus according to claim 10 including a preheating device upstream of the third means.

* * * * *